J. M. JONES.
SPOKE CLIP.
APPLICATION FILED AUG. 16, 1915.
1,192,429.
Patented July 25, 1916.
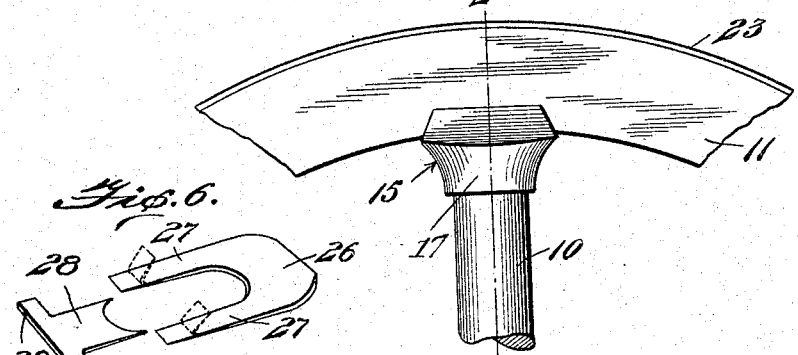
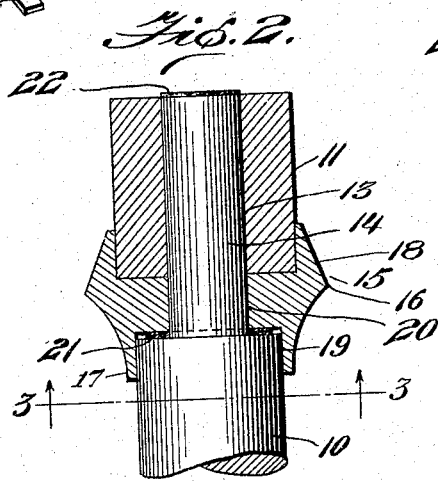
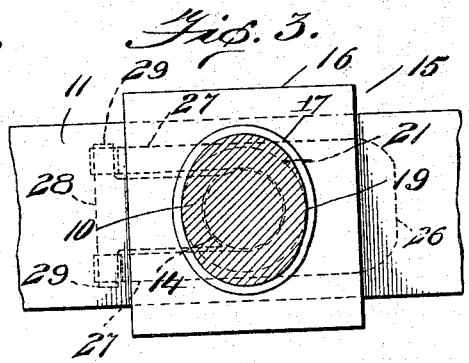
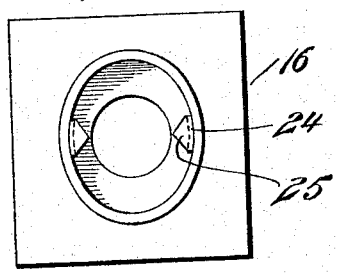
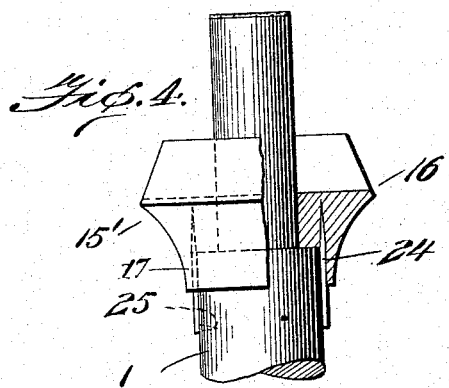
Inventor
J. M. Jones
By David P. Moore
Attorney

UNITED STATES PATENT OFFICE.

JOHN MORGAN JONES, OF NASHVILLE, TENNESSEE.

SPOKE-CLIP.

1,192,429.  Specification of Letters Patent.  Patented July 25, 1916.

Application filed August 16, 1915. Serial No. 45,766.

*To all whom it may concern:*

Be it known that I, JOHN MORGAN JONES, a citizen of the United States, residing at Nashville, in the county of Davidson and State of Tennessee, have invented certain new and useful Improvements in Spoke-Clips, of which the following is a specification, reference being had herein to the accompanying drawing.

This invention relates to improvements in spoke clips, one object of the invention being the provision of a member adapted to be disposed at the junction of the spoke with the felly, either when the wheel is constructed, or as a repair for a broken or split end spoke.

A further object of the invention is the production of a simple, durable and inexpensive clip, and one that may be readily applied in position for use.

With the foregoing and other objects in view and which will appear as the description proceeds, the invention resides in the details of construction as hereinafter set forth and particularly claimed, changes in the precise construction being possible just as long as they are within the scope of what is claimed.

In the accompanying drawings:—Figure 1 is a view in elevation of a portion of the rim, felly and spoke of a wheel with my clip shown in use. Fig. 2 is a section on line 2—2 of Fig. 1. Fig. 3 is a section on line 3—3 of Fig. 2. Fig. 4 shows a modified form of the clip in use. Fig. 5 is a plan view of such clip. Fig. 6 is a detached view of the tightening wedge.

Referring to the drawings, the numeral 10 designates the spoke and 11 the felly, carrying the tire 23 of the wheel.

The felly is provided with the bore 13, for the reception of the reduced end 14 of the spoke, such reduced end being adapted to extend through the felly and in some cases where necessary rest upon the flexible or leather washer or disk 22, which in turn rests against the inside of the rim 12.

The clip 15, is preferably cast metal, and is thickened as at 16, to taper in opposite directions, and thus provide the felly embracing flanges 18, and the elliptical boss 17 having the socket 19, which is also elliptical in shape to receive the enlarged end of the spoke 10. Leading from the inner end of the socket and adapted to concentrically aline with the bore 13 of the felly, is an opening 20, to receive the reduced portion 14 of the spoke, and where necessary a leather gasket 21 is disposed within the socket 19, as shown in Fig. 2. By this means, any deviation in the length of spokes of the wheel may be taken care of, and at the same time a yieldable or cushioning means can be interposed between the spoke end and the abutting portion of the clip.

In the form of clip shown in Figs. 4 and 5, the body portion 15' is identical with that shown in the other figures, there being cast with the same at diametrically opposite points of the socket and adjacent the rim thereof the two relatively resilient tangs or tongues 24, each one of which is provided with the spoke entering point 25. This particular construction is desirable where the clip is placed upon the spoke first, and is held temporarily thereon during the assembling of the wheel. The tongues 24 also assist in holding the clip from turning upon the spoke, so that the flanges are also alined with to receive the felly.

From the foregoing description, it is evident that the present clip can be placed upon a new wheel during the assembling, or may be used as a repair, the same reinforcing the spoke and felly, and preventing the splitting of the spoke at the junction with the felly, or even within the bore of the felly.

As shown in dotted lines in Fig. 3, and in detached position in Fig. 6, the wedge tightener consists of the metal member 26, having the two spaced wedging terminals 27, that are adapted to fit upon the felly between it and the clip or clasp 15. The coöperating member 28 is adapted to be set in from the opposite direction so that its oppositely disposed lugs 29 may rest above the ends of the terminals 27, which being malleable are readily bent up and upon the lugs 29 to thus lock the member 28 from longitudinal movement.

What I claim as new, is:—

1. A spoke clip or connector, made in an integral casting and provided with a spoke receiving socket of irregular shape and having a reduced opening to receive the spoke end, said body being further provided with two parallel felly embracing flanges, the outer sides of which are divergent to provide a reinforced portion, and two resilient tongues projecting from the socket, each of which is provided with a spoke entering prong, 2. The combination with a felly having a spoke receiving opening, and a spoke having a reduced end for insertion in the opening of the felly, of a spoke attaching device comprising a member to straddle the felly and receive the spoke end, and a two membered wedge for positioning between the first member and the felly for wedging such member upon the spoke end, each member of the two membered wedge coöperating to hold each other from separation.

3. The combination with a felly having a spoke receiving opening, and a spoke having a reduced end for insertion in the opening of the felly, of a spoke attaching device comprising a member to straddle the felly and receive the spoke end, and a wedge for positioning between the member and the felly, said wedge comprising a U-shaped member, the terminals of which are wedge shaped, and are malleable, and a T-shaped member for coöperation with the U-shaped member, the arms of the T-shaped member being received by the bent up ends of the U-shaped member to lock the members about the spoke and between the member and felly.

In testimony whereof I affix my signature.

JOHN MORGAN JONES.

Copies of this patent may be obtained for five cents each, by addressing the "Commissioner of Patents, Washington, D. C."